G. B. TAYLOR & C. B. VOYNOW.
RAILWAY.
APPLICATION FILED DEC. 6, 1907.
968,289.
Patented Aug. 23, 1910.
5 SHEETS—SHEET 1.
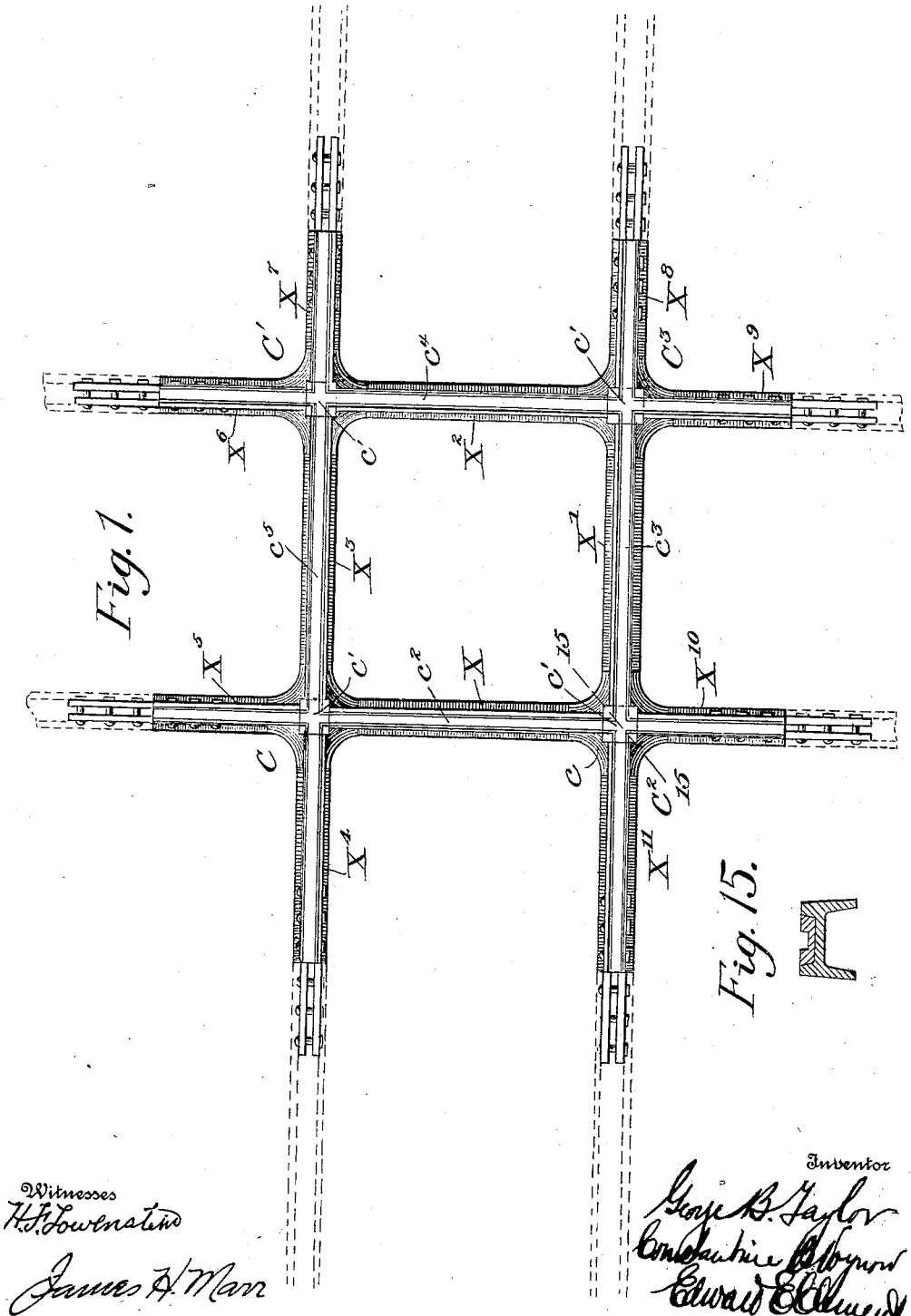

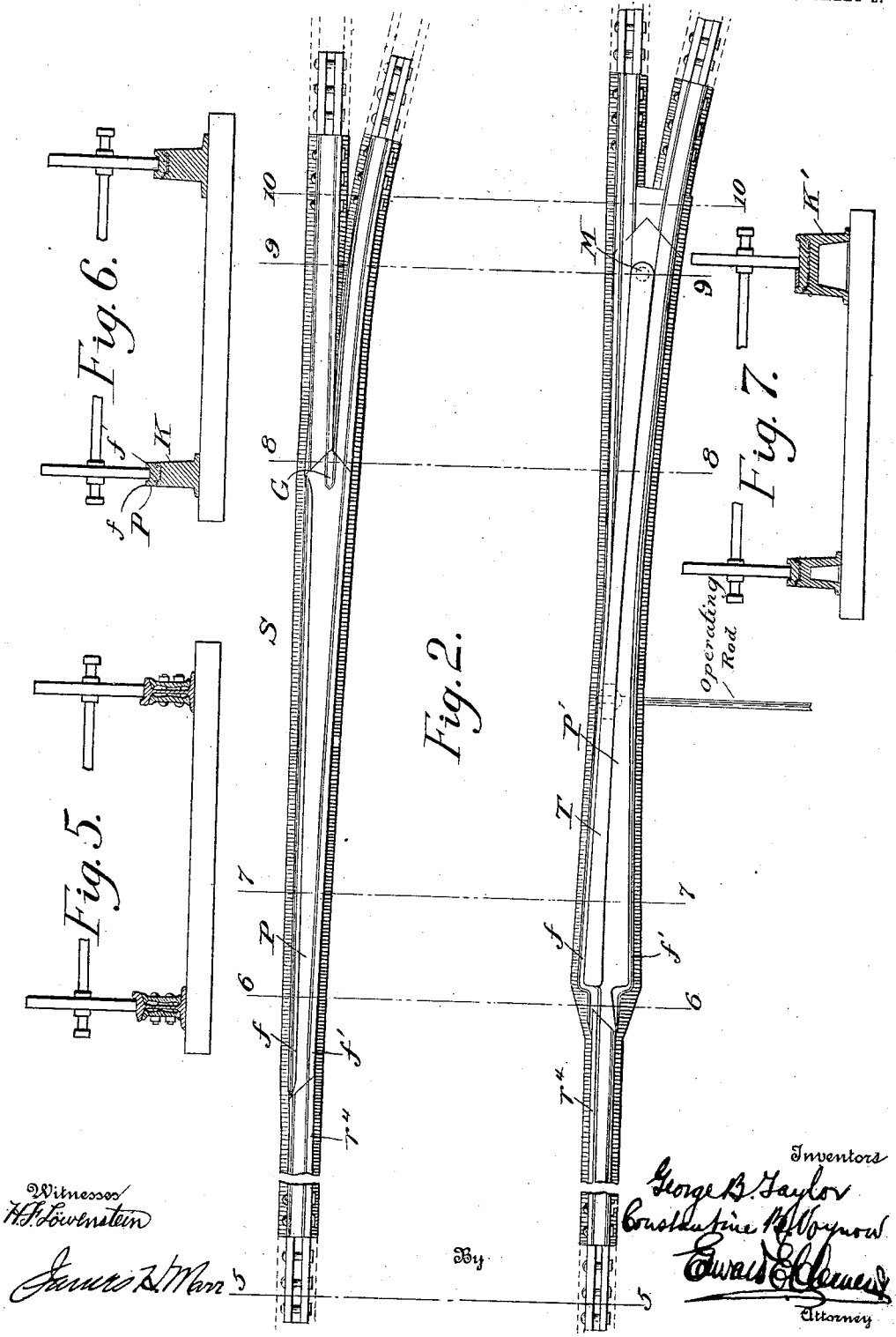

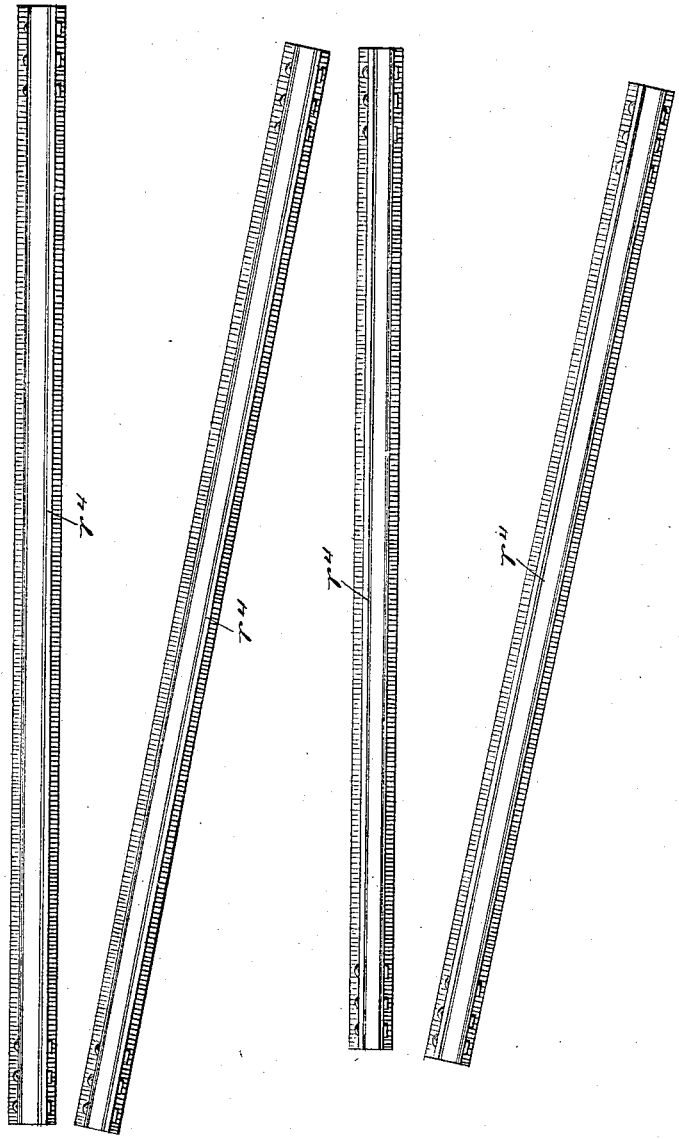

G. B. TAYLOR & C. B. VOYNOW.
RAILWAY.
APPLICATION FILED DEC. 6, 1907.
968,289.
Patented Aug. 23, 1910.
5 SHEETS—SHEET 4.
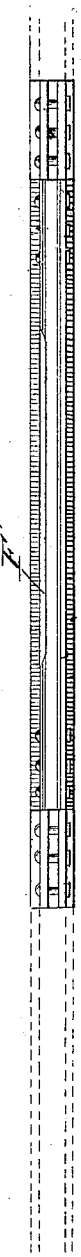
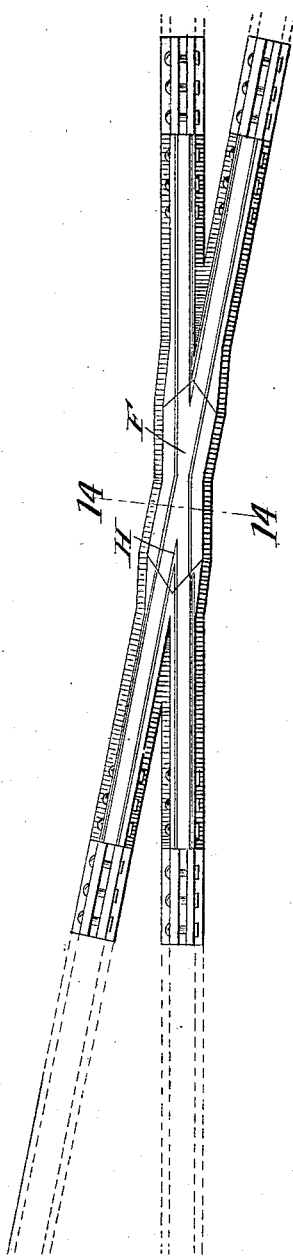

G. B. TAYLOR & C. B. VOYNOW.
RAILWAY.
APPLICATION FILED DEC. 6, 1907.
968,289.
Patented Aug. 23, 1910.
5 SHEETS—SHEET 5.
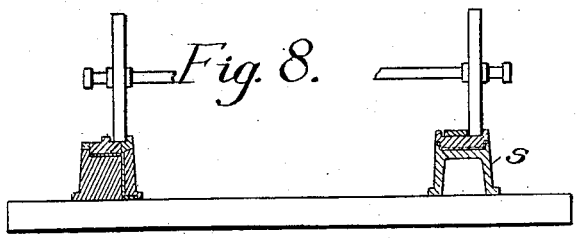
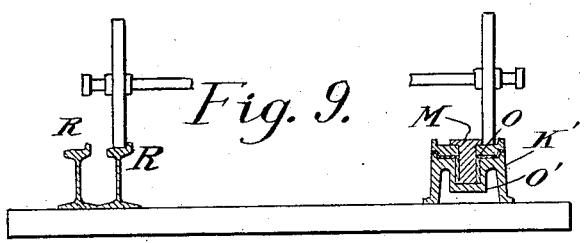
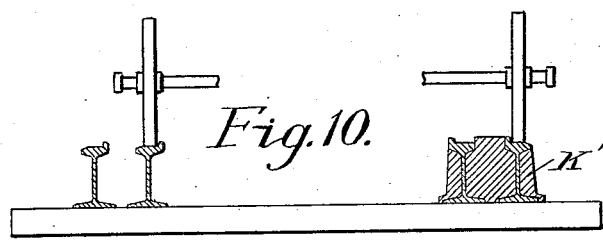
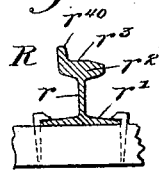
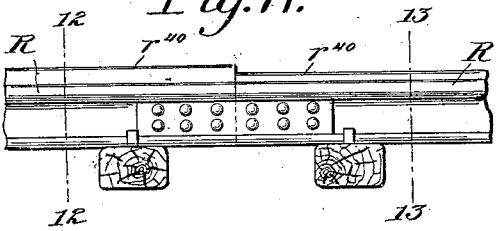
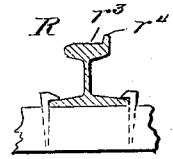

UNITED STATES PATENT OFFICE.

GEORGE B. TAYLOR AND CONSTANTINE B. VOYNOW, OF PHILADELPHIA, PENNSYLVANIA.

RAILWAY.

968,289.  Specification of Letters Patent.  Patented Aug. 23, 1910.

Application filed December 6, 1907. Serial No. 405,445.

*To all whom it may concern:*

Be it known that we, GEORGE B. TAYLOR and CONSTANTINE B. VOYNOW, citizens of the United States, residing at Philadelphia, in the county of Philadelphia and State of Pennsylvania, have invented certain new and useful Improvements in Railways, of which the following is a specification, reference being had therein to the accompanying drawing.

Our invention relates to railways and has for its object the production of an improved system and methods of operation therefor.

Standard railway practice in practically all the countries of the world has now for many years prescribed the use of flanged wheels running upon inverted T rails. This type of rail has a flat or round head or tread portion, a relatively deep web which becomes deeper as the weight of metal and the weight of rolling-stock increases, and a broad foot. Considerable variation in tread section has arisen, and many special forms of rolls have been devised, by reason of the widely varying conditions met with in urban, interurban and long distance hauling; but the flanged wheel remains substantially the same under all conditions, its only variation being in the depth or thickness of the flange and the angle or width of the tread. For interurban and trunk lines where high speeds are necessary, heavy construction and relatively deep flanges are employed of necessity, and in such case the head of the rail has a plain section which has become familiar in all steam railway construction. Where interurban or other outside lines are connected directly with city lines, that is to say where high speed and relatively low speed lines are joined, it is necessary to employ the high or low speed rails throughout if the same wheels are to run over both portions of the system. In local traction lines the tread of the rails is usually on the outside, but a tram or lateral flange is rolled below and inside of the tread so as to form a slot to take the wheel flanges. Of course this slot may vary in depth to a considerable extent without changing the character of the rail, but because of the necessity of keeping the slot clear of obstructions, it is usually made shallow, and of a very wide V-shape, the tram in fact sloping down from the horizontal to an angle of perhaps 70 or 80 degrees with the inner face of the head or tread. If deep wheel flanges are to be accommodated so that interurban cars can pass over city lines, this slot on the rail head must be deepened, with obviously attendant disadvantages.

Regardless of the specific cross section of the rail, wherever the wheel tread travels upon the top of the head, and its flange along the side thereof, it is necessary at all crossings, frogs and switches to provide one or more openings through the rail tread itself for the passage of the wheel flanges. Apart from our own efforts, we are not aware that any serious attempt has been made to design a system which would do away with this grave and fundamental defect. In our prior patent, No. 768,920, dated August 30, 1904, we have described a type of rail which may be employed in the present system and we therefore refer to the said patent, which is to be read in connection with the following description and taken as supplementing the same.

Stated in a word, our present invention comprises a railway system in which the road bed is designed to afford a continuously smooth and unbroken supporting surface for the wheel treads of the cars throughout its entire length and all of its ramifications. We are aware that at various times in the history of the art suggestions have been made looking to the furnishing of straight rails alone, or the equipping of straight stretches of road, which would serve to support and easily pass ordinary vehicles with flangeless wheels, such systems being commonly known as wagon railroads. There are two limitations in connection with wagon railroads which must be borne in mind in considering any broad design for railways in general. One is that the vehicles for which these roads are designed are self directing or automatically guiding; that is to say, the function of the rail is not primarily that of a guide, but merely that of a support. The rails are grooved or flanged just sufficiently to render it easy for the vehicles to be kept upon their trams, and not sufficiently to prevent easy turning of the wheels between the flanges, and their ready passage thereover. Even in the present day of self-propelled vehicles, the essential characteristics of any and every road vehicle is that it is auto-directing as well as auto-propelling. Any road rail which would restrict passing vehicles to its own surface, thereby destroying their individuality and independence of movement, would be a failure for this purpose. Indeed this consideration is potent in many cities in determining the design and character of their traction rails. It is a matter of common knowledge, for example, that in certain cities the type of rail with a flat tram has been maintained long after better sections were being rolled at the mills, simply because the local manufacturers and mercantile interests have found that such a rail increases the longevity of their wagons. In such case the crown or tread of the rail is made as low as the depth of the wheel flange will permit, and the inside of the head is sloped so as to offer as small resistance as possible to wagon wheels turning in and out. This is a practical demonstration of the first limitation in respect to road rails. The second limitation is this, that there is no necessity for any special work in wagon road systems, because, the vehicles being self-directing, crossings and divergences can be and are effected without the guidance of rails, no road system ever having been designed to our knowledge which contemplated more than a plain stretch of rail for rendering hauling easy over some particular piece of road.

Disregarding the primitive and crude designs of road rails, which we have thus shown to be generically different from ours, we believe our present system and all its appurtenances are absolutely novel in conception and development. Two things are essential to all railway systems or networks, viz., rails as such, and special work comprising switches, frogs, crossings, etc. With these, all the multifarious combinations used in railroad practice are formed, and all problems met with must be solved. Moreover, good sense and good practice dictate that a system must be standardized, that is to say, all its parts of the same nature must be of the same type and preferably interchangeable. All sections of rail must be interchangeable, all pieces of special work must be symmetrical and of a type that agrees with the rails and other parts. All functions and operations must be not only symmetrical but uniform and continuous in their nature. Car wheels must not be expected to run upon their flanges at one point and upon their treads at another, nor upon the heads of the rails at one point and upon the trams at another. This is not only because of the effect on the roadbed and the rolling stock, but also because of the effect upon passengers and freight carried.

In conformity with the rules of good practice, we have designed special work and rails, which will be described in detail hereinafter, of such a nature as to realize the broad statement of invention hereinbefore made. By the use of our present invention all of the difficulties heretofore experienced are done away with. The wheels are flangeless and roll upon a continuous, unbroken and solid support throughout all the ramifications of the system which they may have to traverse, regardless of switches, frogs, crossings or the like which according to present practice interpose numerous and awkward breaks in the supporting surface. Interurban and long distance traffic may be handled without difficulty over the ordinary city systems, no special provision being required for the wheels, the difference being in the construction of the rails; the rails in all parts of the system are self-cleaning or practically so, and even the special work is so open in its design as to afford no opportunity for lodgment of obstructions; the liability to accidents is much less than in the ordinary system, since there are no wheel flanges to break; there is little or no possibility of the wheels climbing the rails, and curves, viaducts, or other points requiring special protection may be heavily metaled with very high flanges to resist lateral thrust. Wear and tear on parts such as car bodies, trucks and motors is enormously reduced, and many other advantages inhere which will sufficiently appear from the detailed description hereinafter.

Our invention is illustrated in the accompanying drawings in which—

Figures 1, 2, 3 and 4 represent portions of a railway system and are intended to be read together. Fig. 1 shows a crossing, Fig. 2 a switch, Fig. 3 the diverging rails for the switch, and Fig. 4 the frog. Fig. 5 is a section taken on the line 5—5 of Fig. 2. Fig. 6 is a section taken on the line 6—6 of Fig. 2. Fig. 7 is a section taken on the line 7—7 of Fig. 2. Fig. 8 is a section taken on the line 8—8 of Fig. 2. Fig. 9 is a section taken on the line 9—9 of Fig. 2. Fig. 10 is a section taken on the line 10—10 of Fig. 2. Fig. 11 is a side view of a junction or meeting point between the rails of urban and interurban or long distance lines, showing the difference in rail flanges. Fig. 12 is a section taken on the line 12—12 of Fig. 11. Fig. 13 is a section taken on the line 13—13 of Fig. 11. Fig. 14 is a section taken on the line 14—14 of Fig. 4. Fig. 15 is a section taken on the line 15—15 of Fig. 1.

Referring to the drawings, it will be found upon careful study that we have indicated therein (and shall now describe) all that is fundamentally necessary to enable a person skilled in this art to successfully design and install a complete system. Owing to the necessary limitations of Patent Office drawings, we can only display a relatively small part of such a system, but in order to appreciate the nature and scope of the invention, the illustration must be expanded and its parts distributed in the mind of the reader as they would be in practice, thus, the rail shown in Figs. 3, 9, 10, 11, 12, and 13 is typical of the rail used throughout the system, the switch shown in Fig. 2 is typical of the switches throughout the system, and this is also true of the crossing and frog shown in Figs. 1 and 4 respectively.

In Figs. 6 to 10 inclusive, we have not only shown the rail and switch sections, but in each figure we have also shown a pair of car wheels without flanges, adapted to these rails and the associated special work. The wheels hardly need description beyond this, that their process of manufacture is greatly simplified and they are both cheapened and made longer lived in consequence. They may be cast and chilled, and the wear on the peripheries will be small compared to that which is now exhibited. As a matter of fact, the largest single item of maintenance expense in the conduct of a railroad and especially a traction road, is for replacing wheels. This item is very materially reduced by the use of our type of wheel, first because of the lessened wear and tear upon the rolling stock, and second because of the cheapened character of the wheels employed.

The rail R, which is shown in section in Figs. 9, 10, 12 and 13, has an extended vertical web $r$, a broad foot $r'$, a head $r^2$ having a flat tread $r^3$ directly over the web, and an uprising flange $r^4$ or $r^{40}$. The flange $r^4$ is shown of a height adapted particularly to urban and other low speed lines. The flange $r^{40}$ is much higher, being adapted particularly to interurban or long distance traffic where high speeds are maintained, and for curves, viaducts or other exposed places where guard rails have heretofore been employed. This flange $r^{40}$ may be made as high as conditions require and we contemplate that its height will bear a definite normal relation to the weight of the metal in the rail. In other words, heavy high speed traffic demands heavy rails with high flanges. We always make the height of the tread from the bottom of the foot standard for all rails, so that the long distance or high speed rails can readily be connected by the ordinary fish plates or in any other suitable manner to the low speed rails. A side view of such a connection is shown in Fig. 11, the flange $r^{40}$ on the high speed rail having approximately twice the height of the flange $r^4$ on the low speed rail. The treads, however, it will be observed, are continuous, so that the constant and unbroken level of the rail surface is maintained.

It will be noted upon reference to the figures that we carry the rail flange on the inside of the rail, so that the guiding pressure is on the inner faces of the wheels. Divers reasons exist for this construction, some of which are very important. One end accomplished is the crowning up of the street or other way upon which the rail is laid up to or above the level of the rail flange if desired. Another is the better location of base lines on curves and the like. Where the rail resistance is all on the outside rail, as it is with the ordinary construction, it will be found that there is a tendency to turn with the outside rail as an axis, so as to throw the load over outwardly. Thus even if the wheel flanges hold, there must be critical speeds at and beyond which a train would be necessarily derailed, while below these speeds great uncertainty exists because of the enormous strains brought upon the outside wheel flanges and the outside rail.

According to our present invention, and with the flange on the inside of the rail, we have two courses open to us in constructing a curve. Should we conclude to use our standard rail, which we might safely do within limits, we would gain considerable over the ordinary construction because the resistance to the derailing tendency is exerted on the outside faces of the inside wheels. The axis of any turning moment is therefore shifted at once from the outside rail to the inside rail, and practically the only thing that can produce derailment is the breakage of a wheel or rail.

On sharp curves or those intended for high speed traffic, we prefer to use grooved rails similar in section to those in Fig. 6. Each rail in this case has double flanges, so that the strain is divided between the inner and outer rails, and the danger from any breakage of either rail is correspondingly lessened. We believe that with this construction the present guard rails in many instances can be dispensed with, although conservative practice would dictate their retention even with this construction in some cases. We also in some cases reverse the outside rail, which doubles the flange resistance using standard rails.

Referring now to Figs. 1 and 15, we have therein shown a crossing designed in accordance with our invention. In this and the other special work which we shall describe, we are governed by two fundamental principles. The first is to maintain the rolling surface continuous and unbroken in every direction throughout the system, the second is to keep down the cost of maintenance by reducing the number of wearing parts and making those exposed to maximum wear interchangeable and removable. In the case of the crossing it is necessary of course to provide means for connecting the line rails thereto, and for readily compensating the double wear at the intersections of the rolling surfaces. We may form the body of our crossing of a single casting, but it is preferably formed of twelve separate short lengths of standard rail, and four castings at the intersections. In the case of a solid casting, this includes the four corners C, C', C² and C³, and contains the channels or wheel-ways $c^2$, $c^3$, $c^4$ and $c^5$. The body is advantageously of cast iron, but the wearing surfaces may be hardened steel, set in grooves in the top of the casting, with a filling of spelter or similar material. Such a construction is shown in Figs. 6 to 9 inclusive in respect to the switch body and wearing plate.

At the four intersections of the rolling surfaces or wheel-ways, and resting upon the solid bodies of the castings, we provide removable wear plates or crossing plates $c'$ which may advantageously be of manganese or other very hard steel, and which may be secured in position if desired by pins, bolts or other suitable means. It is of course possible to omit these wear plates, making the surface of the crossings continuous and integral; but since the intersections get the sum total of the wear due to traffic over both intersecting lines, it is safe to assume that the earliest signs of depreciation will be at those points, whose perfection of surface, moreover, must be maintained with the more rigid care because it contributes to the equality of more than one line. A detail of the corner casting and of the wear plate in section is shown in Fig. 15.

Where four separate castings are employed for the crossing, and four lengths of rail X, X', X² and X³, together with the eight connecting ends $X^4$, $X^5$, $X^6$, $X^7$, $X^8$, $X^9$, $X^{10}$, $X^{11}$ are held in position by being inserted into the necessary four corner molds or flasks, and the cast metal is poured around them. The outside lengths of rail thus employed are of standard cross section and may be connected direct to the line rails by means of ordinary fish plates or equivalent devices. The detachable wear plate $c'$ may be used as before, and it should be observed that great care is taken in the process of casting to maintain the treads of the rail sections all in the same plane, for obvious reasons.

Referring now to Fig. 2, we have therein shown our switch S especially designed for this system. The complete switch includes switch and mate pieces which may be directly secured together or secured through the medium of the ties or monolith or other support upon which they are laid. At the extreme left of the figure the rails in a section of ordinary track are seen leading to the switch S. A cross section of the track along the line 5—5 is given in Fig. 5. As shown in that figure ths part of the track consists of flanged rails connected by fish plates in the ordinary manner. At the point at which the tracks first begin to diverge the rails are embedded in an iron casting K in the manner described in connection with the description of the crossing shown in Fig. 1. Farther on toward the switch proper the casting is formed with a groove or socket in its top, the socket being arranged to receive the wear plate P. This wear plate is removable and serves the same purpose as the wear plate C' previously referred to. On the switch side of the track it also serves as the bed plate for the switch tongue T. A cross section of the track structure taken on the line 6—6, is shown in Fig. 6. It will be observed that the wear plate is provided with flanges $f$ and $f'$. The flange $f$ begins at the point of divergence of the track while $f'$ is a continuation of the inner flange $r^4$ of the track rail. The flange $f$ continues to a point at which the two diverging tracks separate. As in the case of the wear plate C' the wear plate P rests upon a filling of spelter in the socket in the top of the cast iron base. This wearing plate P bears at its larger end a guide flange G, the said flange serving to insure the guidance of the wheels into the proper track. On the switch side of the track the wearing plate together with the cast iron base is broadened to make room for the play of the switch tongue T. As shown in the figure the sides of the removable section converge from this point to a point about midway of its length and then diverge again. The switch tongue T is pivotally secured upon the top of the wear or bed plate P' by means of the manganese steel pin M. By referring to Fig. 9 which is a section through the line 9—9 of Fig. 2 it will be seen that the base K' on the switch side of the track at this point is a hollow casting, this resulting in a saving of metal while the broad base provides a sufficiently stable support. The pivot pin is fitted to a bearing O provided in an extension O' in the interior of the base. On the switch side of the track the flange $f$ forms a continuation of the rail flange $r^4$ while the flange $f'$ begins on the outer edge of the rail and extends to a point slightly beyond the pivot pin. These two flanges $f$ and $f'$ are deflected outwardly to form recesses for the play of the switch tongue T as stated heretofore.

It will be apparent that with the switch tongue T in the position shown in Fig. 2 the tongue will constitute a continuation of the inner rail flange on the switch side thereby deflecting the wheels onto the branch track, while by shifting the switch tongue to the opposite side the tongue will constitute a guide member to keep the wheels on the straight track i. e. the upper one in the figure. Any suitable method of shifting the switch tongue may be used. It may be done manually, or by some form of automatic mechanism. It will be seen by an inspection of Fig. 10 that the diverging rails at this point are embedded in a solid base K' of metal. The bed plate or wear plate D' is designed to rest in a socket upon a filling of spelter in the same manner described in connection with the plate P' on the mate side. In Fig. 7, which shows a section taken on the line 7—7 of Fig. 2, the supporting cast iron base K' is shown hollow thus also providing for a saving of metal at this point without sacrificing stability.

A typical frog used in our railway system is shown in Fig. 4. It consists in general of the converging rails embedded in a cast metal base in the manner already described heretofore. A wear plate F is provided at the intersection of the inner rails of the two tracks and rests upon a hollow base K' of cast metal, a section of which is shown in Fig. 14 this figure being taken on the line 14—14 of Fig. 4. The wear plate F is provided at the ends with guide flanges H, these flanges being prolongations of the inner rail flanges of the straight and branch tracks respectively. Opposite the point of intersection on the outer rails of each track are additional flanges F' and F² these flanges being designed to further insure the proper guidance of the wheels.

It will be seen from the above description that we have provided a system of trackage whose rolling surface is solid, continuous, unbroken and uniform throughout; that the crossings, switches and frogs of the system are so designed as to do away with the jolting and bumping common in the passage of the wheels over these portions; that the wear and tear on the wheels thus is greatly lessened since the wheels used in this system have no guide flanges to be used as treads in passing over crossings, switches or frogs; that the wear on the track itself is lessened; and that the chance of derailing is materially decreased.

Having thus described our invention what we claim and desire to secure by Letters Patent is:

1. In a railway system having a continuous unbroken and uniform rolling surface for the passage of car wheels, a switch comprising the following instrumentalities: a cast body, end pieces embedded in said cast body and forming projections therefrom adapted for direct connection with the line rails and having a section uniform therewith, a hardened wear or bearing plate set into the top of said cast body and flanged on both sides to form an elongated chamber for the switch tongue having its surface in the same plane with the incoming and outgoing surfaces of the end portions and rails, and an elongated switch tongue with one end in said chamber between divergent end pieces adapted to be swung across the chamber so as to form a continuation of the guiding flanges on opposite sides, said tongue having bearing surfaces on its sides only, and arranged so as to take lateral thrusts from the passing wheels without carrying any load.

2. In a railway system having a continuous unbroken and uniform rolling surface throughout, a switch member and a mate member, the former provided with a tongue adapted to be swung from side to side to guide passing car wheels by lateral pressure only without carrying any part of the load, the mate having flanges on both sides, diverging toward the switching end, said flanges adapted to supplement and co-act with the switch tongue in its two positions, so as to positively guide the wheels on either side of the tongue.

3. In a railway system having a continuous unbroken and uniform rolling surface throughout, a switch member and a mate member, the former provided with a tongue adapted to be swung from side to side to guide passing car wheels by lateral pressure only without carrying any part of the load, the mate having flanges on both sides, diverging toward the switching end, said flanges adapted to supplement and co-act with the switch tongue in its two positions, so as to positively guide the wheels on either side of the tongue.

4. In a railway system having a continuous, solid, unbroken and uniform rolling surface throughout, a switch comprising two opposite members, each provided with means for guiding wheels positively in either one of two directions, said means being subject to lateral pressure only, and carrying no weight.

5. In a railway system having a continuous, solid, unbroken and uniform rolling surface throughout, a pair of switch members each having a channel and a movable tongue therein sliding over the wear plate or rolling surface of said channel and adapted to be moved from side to side to form a lateral guide for a pair of wheels passing through the channel, without carrying the weight thereon.

6. In a railway system having a continuous, solid, unbroken and uniform rolling surface throughout, a pair of track rails having supporting webs, expanded heads and continuous inside flanges on the heads, and a curve composed of rails constituting a continuation of said track rails, both of which have flanges on the outside to resist the lateral thrust of wheels passing around the curve.

7. In a railway system having a continuous, solid, unbroken and uniform rolling surface throughout, a pair of track rails having supporting webs, expanded heads and continuous inside flanges on the heads, and a pair of curve rails forming a continuation thereof, both of said curve rails having outside flanges and one or both of them having inside flanges whereby double resistance is offered to outside thrust on the curve, and normal resistance to inward displacement.

8. In a railway system, a track rail having a broad foot, a thin vertical web, and a head centrally supported on said web with its top forming a substantially flat or plane surface and having a vertical flange extending along one edge throughout its length, in combination with special work forming a continuation of said rail, carrying its flat rolling surface beside or between lateral guides so that it extends continuous, uniform, and unbroken, throughout the entire system.

In testimony whereof we affix our signatures in presence of two witnesses.

GEORGE B. TAYLOR.
CONSTANTINE B. VOYNOW.

Witnesses:
H. B. NICHOLS,
BENJ. STOTT.